United States Patent
Kelly

(10) Patent No.: US 11,520,395 B2
(45) Date of Patent: Dec. 6, 2022

(54) INTEGRATED CIRCUIT POWER SYSTEMS WITH MACHINE LEARNING CAPABILITIES

(71) Applicant: Intel Corporation, Santa Clara, CA (US)

(72) Inventor: Anthony Kelly, Limerick (IE)

(*) Notice: Subject to any disclaimer, the term of this patent is extended or adjusted under 35 U.S.C. 154(b) by 1171 days.

(21) Appl. No.: 15/847,136

(22) Filed: Dec. 19, 2017

(65) Prior Publication Data

US 2019/0041948 A1     Feb. 7, 2019

(51) Int. Cl.
| | |
|---|---|
| *G06N 20/00* | (2019.01) |
| *G06F 1/3206* | (2019.01) |
| *G05B 13/02* | (2006.01) |
| *G05B 23/02* | (2006.01) |
| *G05B 19/042* | (2006.01) |
| *G06F 1/28* | (2006.01) |
| *G06F 1/26* | (2006.01) |

(52) U.S. Cl.
CPC ......... *G06F 1/3206* (2013.01); *G05B 13/027* (2013.01); *G05B 19/0426* (2013.01); *G05B 23/024* (2013.01); *G05B 23/0229* (2013.01); *G06F 1/26* (2013.01); *G06F 1/28* (2013.01); *G06N 20/00* (2019.01); *G05B 23/0275* (2013.01); *G05B 2219/25359* (2013.01)

(58) Field of Classification Search
CPC . G06F 1/3206; G05B 13/027; G05B 23/0229; G05B 23/0275
See application file for complete search history.

(56) References Cited

U.S. PATENT DOCUMENTS

| | | | | |
|---|---|---|---|---|
| 9,691,034 B2* | 6/2017 | Lee | ......................... | G06N 20/00 |
| 2007/0114985 A1* | 5/2007 | Latham | .................. | H02M 3/157 |
| | | | | 323/283 |
| 2008/0157743 A1* | 7/2008 | Martin | ................ | H02M 3/1584 |
| | | | | 323/284 |
| 2013/0207630 A1* | 8/2013 | Rahardjo | .............. | H02M 3/156 |
| | | | | 323/283 |

(Continued)

FOREIGN PATENT DOCUMENTS

EP     3079062 A1     10/2016

OTHER PUBLICATIONS

Analog Devices, Digital Controller for Power Supply Applications with PMBus Interface, Data Sheet ADP1055, Feb. 23, 2017. <http://www.analog.com/media/en/technical-documentation/data-sheets/ADP1055.pdf>.

(Continued)

*Primary Examiner* — Gary Collins
(74) *Attorney, Agent, or Firm* — Fletcher Yoder, P.C.

(57) ABSTRACT

A power system that uses machine learning algorithms to solve various problems related to the delivery of power on integrated circuit systems is provided. The power system may process data on a platform near the target integrated circuit or off-platform in a cloud so that the machine learning algorithms can extract information from the data, process and analyze the data, and perform suitable action based on the analysis results. Applying machine learning to integrated circuit power delivery may involve the application of algorithms such as anomaly detection, load prediction, regression, and classification. Operated in this way, the power system may be provided with improved voltage/frequency scaling capabilities, security, and power efficiency.

20 Claims, 12 Drawing Sheets

(56) References Cited

U.S. PATENT DOCUMENTS

2017/0366010 A1* 12/2017 Chen ................ H02S 50/10

OTHER PUBLICATIONS

F. Mihalic, D. Gleich and P. Planinsic, "Automatic ripple analysis of DC-DC converter," The IEEE Region 8 EUROCON 2003. Computer as a Tool., 2003, pp. 160-162 vol. 1.

B. Miao, R. Zane and D. Maksimovic, "System identification of power converters with digital control through cross-correlation methods," in IEEE Transactions on Power Electronics, vol. 20, No. 5, pp. 1093-1099, Sep. 2005.

Z. Cen and P. Stewart, "Condition Parameter Estimation for Photovoltaic Buck Converters Based on Adaptive Model Observers," in IEEE Transactions on Reliability, vol. 66, No. 1, pp. 148-160, Mar. 2017.

F. Kurokawa, H. Maruta, K. Ueno, T. Mizoguchi, A. Nakamura and H. Osuga, "A new digital control DC-DC converter with neural network predictor," 2010 IEEE Energy Conversion Congress and Exposition, Atlanta, GA, 2010, pp. 522-526.

W. Auckland, I. E. D. Pickup, R. Shuttleworth and C. Zhou, "Artificial neural network-based method for transient response prediction," in IEE Proceedings—Generation, Transmission and Distribution, vol. 142, No. 3, pp. 323-329, May 1995.

\* cited by examiner

INTEGRATED CIRCUIT POWER SYSTEMS WITH MACHINE LEARNING CAPABILITIES

BACKGROUND

Integrated circuits such as application-specific integrated circuits (ASICs) and programmable logic devices (PLDs) are often used to implement high performance applications with high throughput or high bandwidth requirements. Such high performance applications require these integrated circuits to be powered using accurately controlled power supply voltages within tight regulation bands and well controlled sequencing.

Existing system power policies call for data associated with power rails such as the voltage, current, and temperature to be available to the power system and the users. Despite the availability of such power-related data, any collected data is not utilized for online analytics due to significant challenges in the practical processing of large quantities of data, where the dimensionality of the data limits the computational ability of the system to provide actionable steps.

An example of a conventional power system includes acquiring data, but the data is sampled and stored for batch analysis offline. The data storage does not take place within the system and the data is not captured online continuously, which limits the ability for the system to continuously monitor the power rail. Another example includes an online system analysis for a buck converter, but the relevant data is not stored in a memory within the system, which limits the applicability to only recursive online methods. Moreover, none of the existing methods describes anticipating a load disturbance at the power rails by monitoring past load behavior.

It is within this context that the embodiments described herein arise.

DETAILED DESCRIPTION

The present embodiments relate to integrated circuits and in particular, to a power system that uses machine learning algorithms to solve various problems related to power delivery to the integrated circuits. The power system may process data locally on a platform that includes an integrated circuit, a power conversion system, and a power data processor or off the platform in the cloud. Applying machine learning to deliver power to integrated circuits may involve the application of algorithms such as anomaly detection, load prediction, and classification. Power-related data may be extracted from the system, processed into a suitable form, analyzed, and acted upon to resolve potential issues.

It will be recognized by one skilled in the art, that the present exemplary embodiments may be practiced without some or all of these specific details. In other instances, well-known operations have not been described in detail in order not to unnecessarily obscure the present embodiments.

Figure 1:
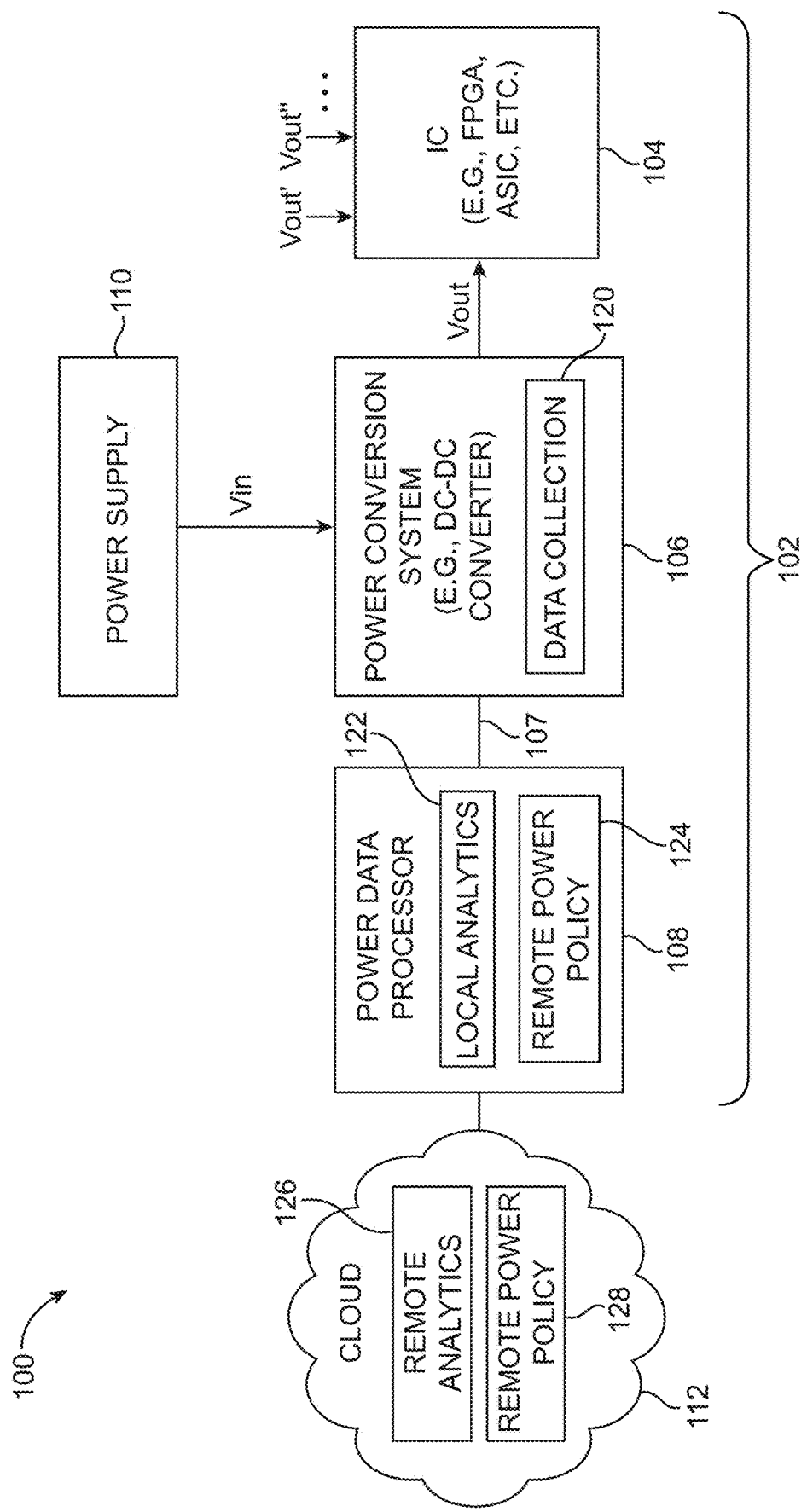
FIG. 1 is a diagram of an illustrative power analytics system in accordance with an embodiment.

A system such as power analytics system 100 is shown in FIG. 1. As shown in FIG. 1, power analytics system 100 may include an local platform 102 coupled to an off-platform subsystem such as cloud 112. Platform 102 may include an integrated circuit such as device 104, a power conversion system such as power conversion system 106, and a processor such as power data processor 108. Integrated circuit device 104 may be an application-specific integrated circuit (ASIC), a central processing unit (CPU), a graphics processing unit (GPU), a microcontroller, a microprocessor, a programmable integrated circuit such as a programmable logic device (PLD) or a field-programmable gate array (FPGA), or other suitable types of integrated circuits.

Device 104 may have one or more power supply terminals (sometimes referred to as power rails). Each power supply terminal may receive a power supply voltage signal from a corresponding power conversion system 106. In the example of FIG. 1, device 104 may receive power supply voltage Vout from power conversion system 106 but may also receive other power supply voltages such as Vout' and Vout" from additional power conversion systems.

Power conversion system 106 may be a DC-DC converter (as an example) that receives an input power supply voltage Vin from power supply source 110. Configured in this way, power conversion system 106 may serve to convert input voltage Vin and generate corresponding output voltage Vout, which is then delivered to device 104. Power conversion system 106 may include a data collection block 120 that is configured to extract and collect data from the power supply. Data collected on platform 102 (sometimes referred to as platform data) may include data associated with the voltage, current, power, temperature, mode, and/or any activity at device 104 (as examples). Data collection block 120 may include a data reduction circuit to limit the volume and velocity of the data that needs to be analyzed by system 100.

Power conversion system 106 may be coupled to power data processor 108 via a communications bus such as bus 107. Data collected at power convention system 106 may be conveyed to power data processor 108 via bus 107 for local processing. Power data processor 108 may include a local analytics block 122 and a local power policy block 124. Local analytics block 122 analyzes the received data locally and controls the local power delivery by directing local power policy block 124 to take suitable actions based on analyzed results.

Power data processor 108 may be coupled to cloud computing subsystem 112, which is configured to provide cloud-computing-based analytics on the collected power conversion data. Cloud 112 may include a remote analytics block 126 and a remote power policy block 128. Remote analytics block 126 may be configured to perform more data-intensive analytics and to apply various machine learning algorithms to the large volume of data received from platform 102 or from many platforms 102 whose data is aggregated from multiple integrated circuit devices. Operated in this way, remote analytics block 126 may then control the local power delivery by directing local power policy block 124 to take suitable actions at the respective platform(s). In other words, the local, edge, or cloud based analytics blocks may determine suitable actions to be taken based on the analyzed results and/or provide an updated power model based on the data.

Figure 2:
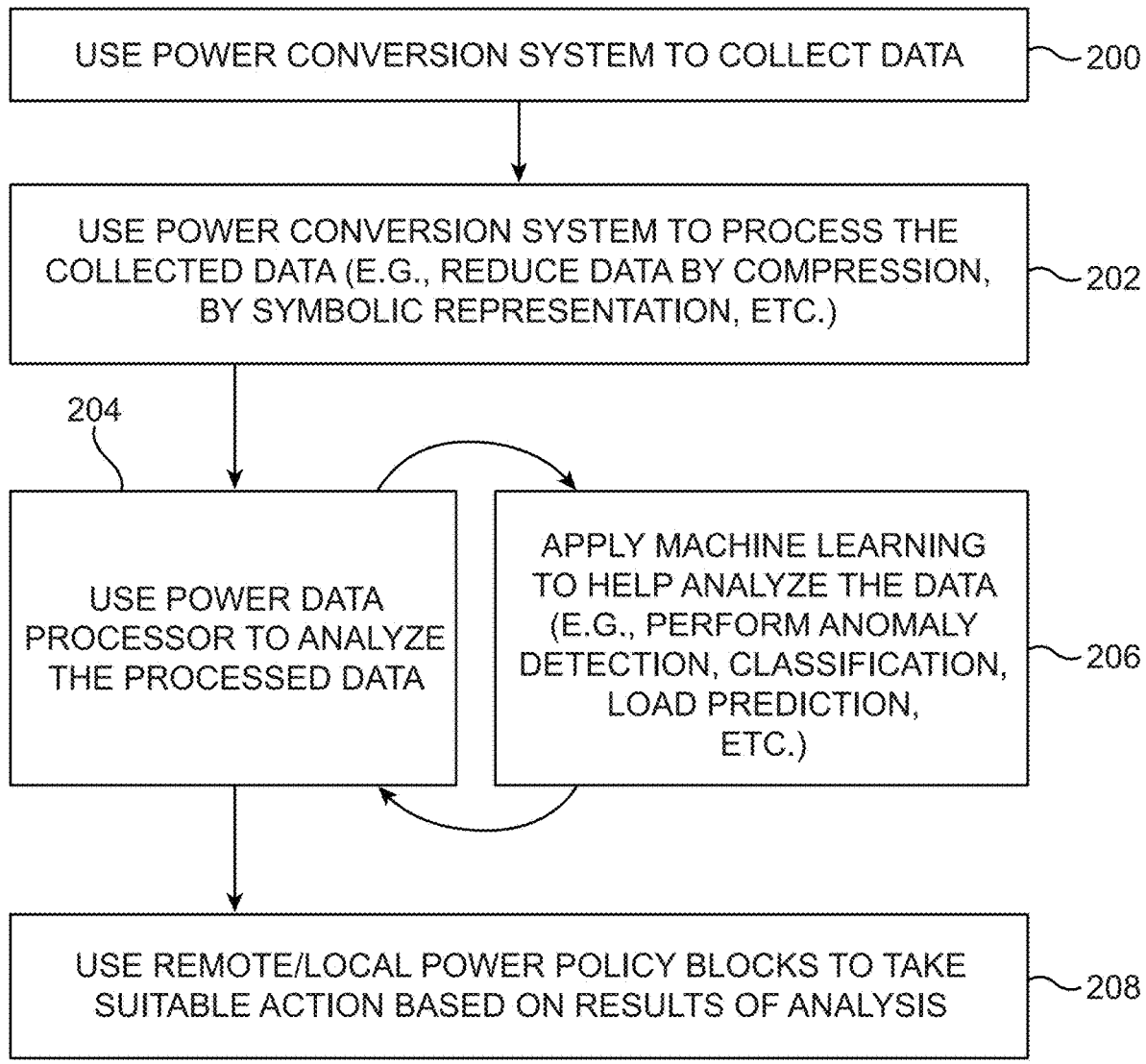
FIG. 2 is a flow chart of illustrative steps for operating the power analytics system shown in FIG. 1 in accordance with an embodiment.

FIG. 2 is a flow chart of illustrative steps for operating power analytics system 100. In general, the local and remote analytics blocks are configured to perform data processing, data analysis, and data learning, whereas the local and remote policy blocks implement suitable actions.

At step 200, power conversion system 106 may collect data. At step 202, power conversion system 106 may process the collected data (e.g., by reducing the data by compression, symbolic representation, etc.).

At step 204, the optionally reduced data may be fed to data processor 108 via bus 107 and be analyzed by the local analytics block. If desired, the data may also be fed to the cloud and be analyzed by the remote analytics block.

At step 206, the local/remote analytics blocks may apply machine learning algorithms to help analyze the data. For example, the analytics blocks may be configured to perform anomaly detection, data type classification, load prediction, etc.

The machine learning process may either be supervised or unsupervised. In a supervised learning scenario (e.g., for classification algorithms), the learning step may be computationally intensive and is typically run during a separate learning phase but is not required during operation after learning is complete. Therefore, supervised learning would be better suited to reside off-platform in the cloud (for example). The data analysis and action steps will still be handled locally since they typically a quicker response time.

In an unsupervised learning scenario (e.g., for anomaly detection), the learning step would run during normal operation (e.g., learning would run continuously in real time). Therefore, unsupervised learning would be better suited to be split such that time sensitive and non-computationally intensive tasks are carried out on-platform, whereas time insensitive and computationally intensive tasks would be carried out off-platform on the cloud.

At step 208, the local/remote power policy blocks may direct the power conversion system to take suitable action based on the results of the machine learning analysis. Some exemplary actions that might be taken may include alerting a supervisor system in a remote platform, changing the mode or parameters of the DC-DC converter, changing the mode or parameters of other components in the power system, providing action status to device 104 so device 104 knows what is happening, changing the Vout level or any voltage level in the power system, changing the operating clock frequency of device 104, reconfiguring the local platform differently, predicting an upcoming loading step at device 104, etc.

The steps of FIG. 2 are merely illustrative and are not intended to limit the present embodiments. At least some of the existing steps may be modified or omitted; some of the steps may be performed in parallel; additional steps may be added or inserted; and the order of certain steps may be reversed or altered. For example, these steps may be performed for each power supply voltage Vout, Vout', . . . , and Vout" that is delivered to a target integrated circuit device 104.

Figure 3:
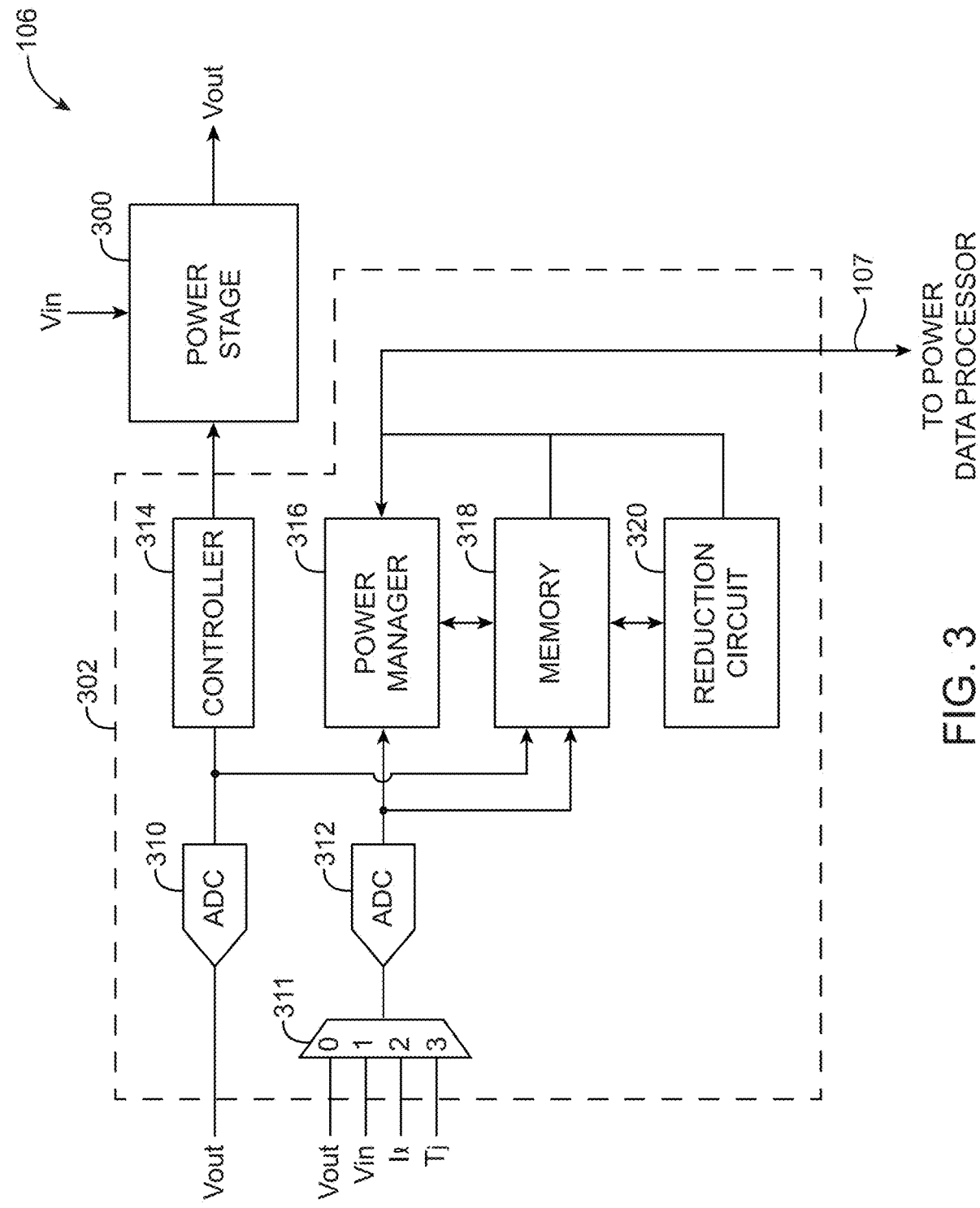
FIG. 3 is a diagram of an illustrative power conversion system in accordance with an embodiment.

FIG. 3 is a circuit diagram of one suitable implementation of power conversion system 106. As shown in FIG. 3, power conversion system 106 may include a power stage 300 and associated control circuitry 302 for controlling power stage 300. Power stage 300 may be configured to convert input voltage Vin to a corresponding output voltage Vout. Control circuitry 302 may include a controller circuit 314, a power manager circuit 316, a local memory circuit 318, and a data reduction circuit 320. In one suitable arrangement, all of the circuits of control circuitry 302 may be form on a single integrated circuit die as a system-on-chip (SoC). If desired, circuitry 302 and power stage 300 may collectively be implemented on a single chip.

Reduction circuit 320 may be configured to reduce the amount of data collected via down-sampling, binning, or decimation to allow bus interface 107 to operate at an appropriate rate. The reduced data may be stored locally at memory 318 before being conveyed to the power data processor via path 107.

Controller 314 may be configured to receive data from data converter 310 (e.g., an analog-to-digital data converter) that is proportional to the control error between Vout and a predetermined set point (e.g., a target power supply voltage level or a nominal power supply voltage level). Controller 315 outputs a signal to power stage 300 to control the conversion of input signal Vin to output voltage Vout. For example, the control signal may be a pulse-width modulated (PWM) signal to control corresponding power switching devices. In such a PWM system, the ADC sampling rate may be at least as fast as the switching frequency of the PWM signal. Sampling rates of 200 ksps (kilo samples per second) to 2 Msps (mega samples per second) or more may be used at ADC 310.

Power manager 316 may receive data from data converter 312 (e.g., an ADC circuit). Converter 312 may be coupled to multiplexer 311 so that a variety of system signals can be monitored for fault detection. For example, multiplexer 311 may receive Vout, Vin, an inductor current Il in power stage 300 (which can be used as a proxy of the output current of power stage 300), temperature Tj (e.g., the temperature of the system or a particular component such as an inductor or a power switch), etc.

Power manager 316 may also manage the power-on and power-off of Vout, handle the action for faults and warnings, and handle signal conditioning such as filtering of the monitored signals. Since ADC 312 associated with power manger 316 has to sample several signals, it may provide data at a relatively lower rate than controller 314. For example, sampling rates of 1-100 ksps might be used at ADC 312. Bus interface 107 may convey the data sampled from the monitored signals, the status of faults warnings, and may receive configuration commands and data from power data processor 108 or other host microcontroller.

Memory circuit 318 may be configured to store the data from the data converter 310 and/or data converter 312.

Memory circuit 318 may process the sampled data, preferably in conjunction with data reduction circuit 320 and power manager 316 to reduce the data by means of deriving signals not directly available or via other methods of reducing the dimensionality of data.

The exemplary arrangement of power conversion system 106 shown in FIG. 3 is merely illustrative. If desired, system 106 may include more circuit components or fewer circuit components to carry out the data collection functionality. Circuits 314, 316, 318, and 320 may be interconnected in other ways and any number of data converters may be included to sample any input data of interest.

Figure 4A:
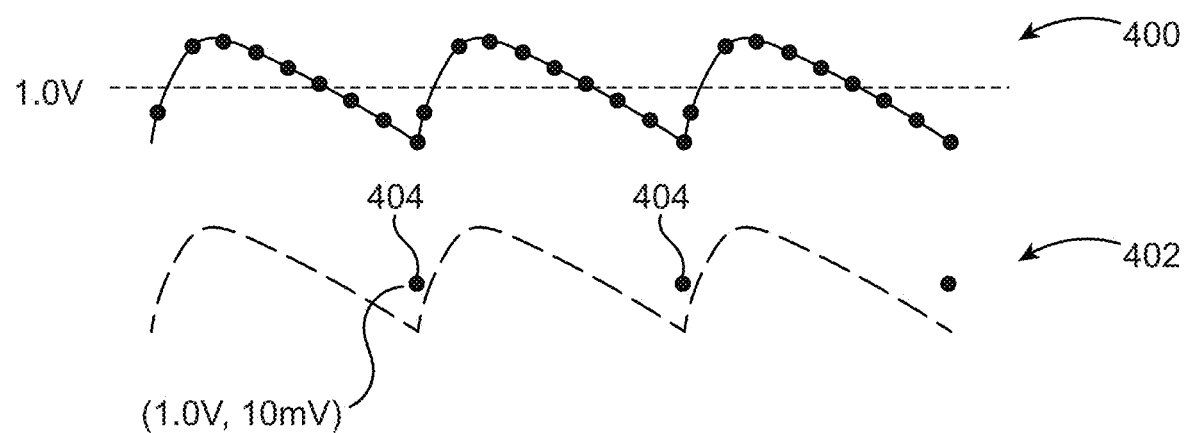
FIG. 4A is a diagram showing how data can be reduced via compression in accordance with an embodiment.

The collected data may be reduced in various way at the processing step 202 (see FIG. 2). As examples, the gathered data may be reduced via decimation, compression, clustering, symbolic representation, or transformation, each of which exhibits its own benefits and trade-offs. FIG. 4A is a diagram showing how data can be reduced via compression. The control ADC 310 may be configured to oversample the output voltage Vout such that the ripple information is available (see FIG. 3). The output voltage Vout may then be derived by memory circuit 318 and stored in a reduced form. As illustrated in FIG. 4A, waveform 400 shows the ADC samples from control ADC 310, whereas waveform 402 shows a reduced data rate where each data point 404 includes an average output voltage level (e.g., 1.0 V) over a PWM period and a peak ripple voltage (e.g., 10 mV) over the same period. In this example, compression may provide a 5-10× reduction in data size.

Figure 4B:
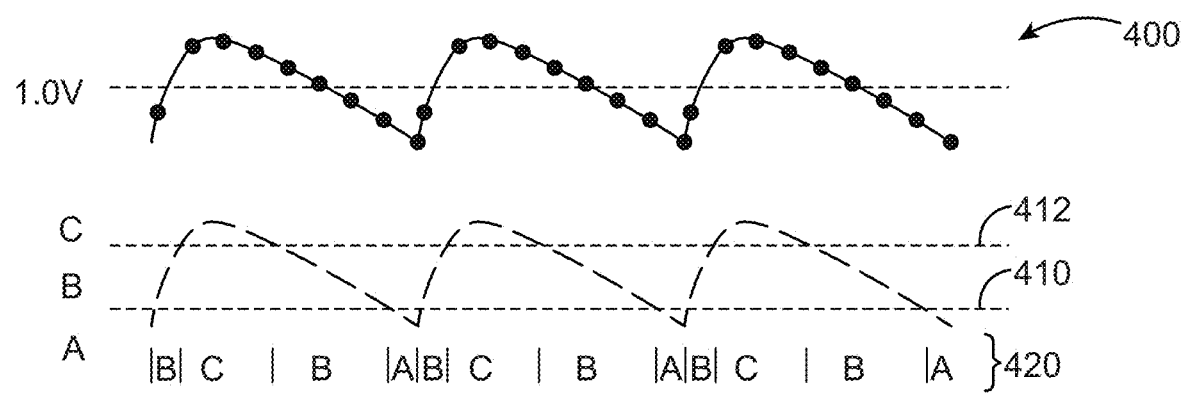
FIG. 4B is a diagram showing how data can be reduced via symbolic representation in accordance with an embodiment.

FIG. 4B is a diagram showing how data can be reduced via symbolic representation. The control ADC 310 may sample output voltage Vout at the high sampling date to capture the ripple behavior. Voltage levels are then binned into various bin levels such that the statistics of the signal are preserved and such that later analysis of the data will be invariant to the symbolic data reduction. The bin level determination may be performed offline a priori, online within the system on chip (e.g., within the platform), or at a connected device a posteriori.

The data reduction may be achieved by representing the data by its assigned symbol. This can be done at each original sampling point, by reducing the bit width required for transmission/storage, or as shown in FIG. 4B, where reduction is provided by assigning the symbolic representation 420 only upon detecting the crossing of certain voltage threshold levels 410 and 412. In the example of FIG. 4B, when the voltage falls below threshold 410, a symbol of A is assigned. When the voltage rises above threshold 410, a symbol of B is assigned. When the voltage rises above threshold 412, a symbol of C is assigned. Each symbol may also be paired with a corresponding time stamp to help track the temporal behavior of the sampled signal.

Figure 5A:
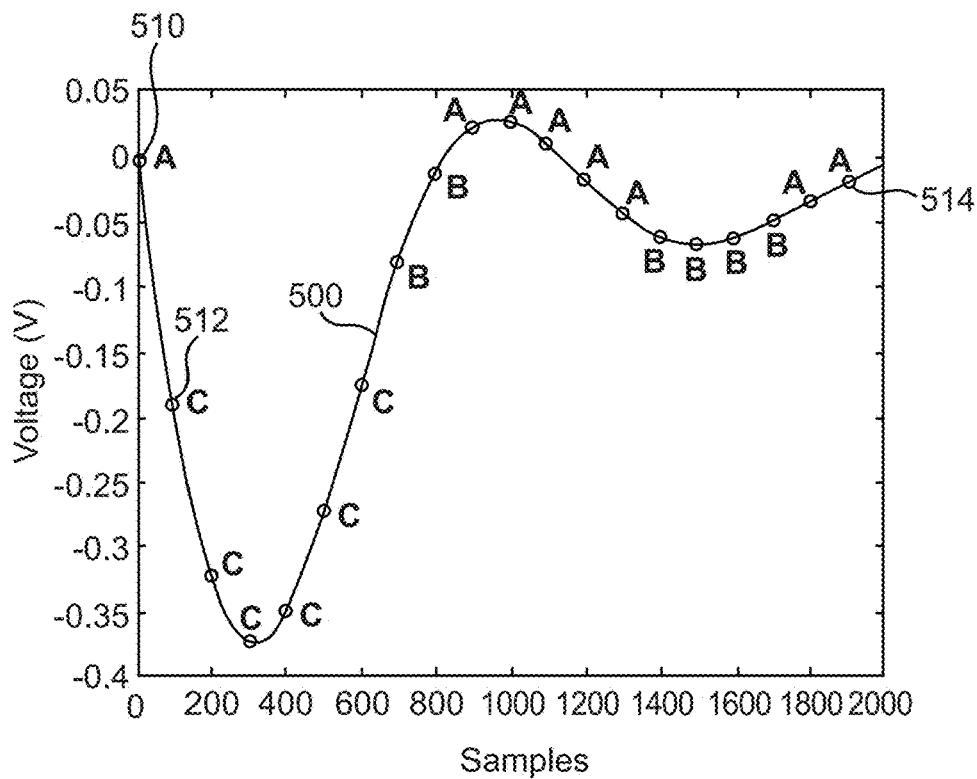
FIGS. 5A and 5B are diagrams showing how a dynamic signal may be represented in a state space in accordance with an embodiment.
Figure 5B:
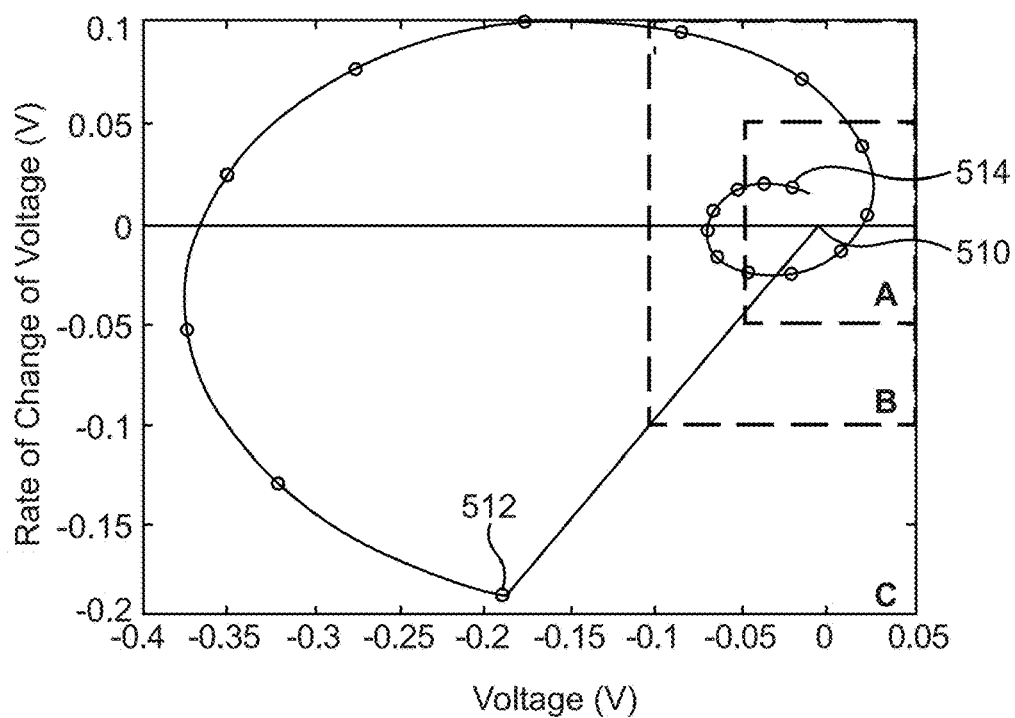

Dynamic signals may be reduced in a similar fashion. Consider the output voltage response shown in FIG. 5A, which shows the output voltage as a function of sampling time, centered at zero volts for illustrative purposes. FIG. 5B shows the rate of change of the output voltage as a function of the output voltage level. As an example, the state space of FIG. 5B may be divided into three separate regions A, B, and C. Region A represents the slowest rate of change with around +/−0.05 V deviation from the nominal level. Region B represents an intermediate rate of change with +/−0.05 to 0.1 V deviation from the nominal level. Region C represents the highest rate of change with +/−0.1 V or more deviation from the nominal voltage level. FIG. 5A shows how the dynamic signal 500 can be reduced to a series of state space data symbols (e.g., CCCCCCBBAAAAABBBBAA). In the example of FIG. 5, point 510 is the reset state, point 512 is the first sampled symbol, and point 514 is the last sampled symbol.

Moreover, further reduction can be achieved by communicating the relevant symbol only when the dynamic signal enters a particular region (e.g., a data symbol may be time-stamped only when traversing between two different state space regions). If desired, other signals such as an inductor current at the power stage and the output voltage may be combined on a phase plane and reduced using symbolic representation in a similar fashion (e.g., many signals and parameters may be combined to form samples of high dimensionality, which may in turn be reduced by any suitable technique).

The processing and computing elements at various parts of the platform or the cloud are configured to process and analyze the data for the purpose of taking action based on the data. Such action may involve classification, prediction, model identification, and the like to provide user feedback. Such feedback may involve data visualization methods to improve the ability of actions to be taken as a result.

Applying machine learning to SoC power delivery may involve the application of machine learning algorithms such as anomaly detection, classification, prediction, and regression. These analytical algorithms may involve models that are modified according to the data. Such models may suitably employ Bayesian methods, Neural Networks, Deep Belief Networks, Kernel Functions, regression models, K-Nearest Neighbor methods, etc. In general, any type of statistical learning process that retains statistical data may be implemented.

These machine learning processes provide technical improvements to the overall computer system. As examples, anomaly detection enables adaptive voltage scaling for programmable integrated circuits; anomaly detection and regression improves dynamic voltage and frequency scaling (DVFS) by automatically learning the DVFS profile; anomaly detection allows for identification of power-related attack vectors in security applications; load prediction enables a tighter power supply voltage tolerance, leading to higher frequency binning; and classification improves power efficiency by identifying the correct power mode based on analyzed power data. These different types of machine learning algorithms are not mutually exclusive and may all be implemented as part of one system.

To illustrate an example of anomaly detection, consider a system such as system 100 of the type shown in FIG. 1 in which integrated circuit device 104 has several high-current voltage rails (e.g., Vout, Vout', Vout", etc.) each requiring precision voltage control. As an example, power conversion system 106 may be configured to control each voltage rail to within a few percent of its nominal voltage level (e.g., within 1% or less, within 5% or less, within 10% or less, etc.) and to do so efficiently under varying load conditions.

Figure 6A:
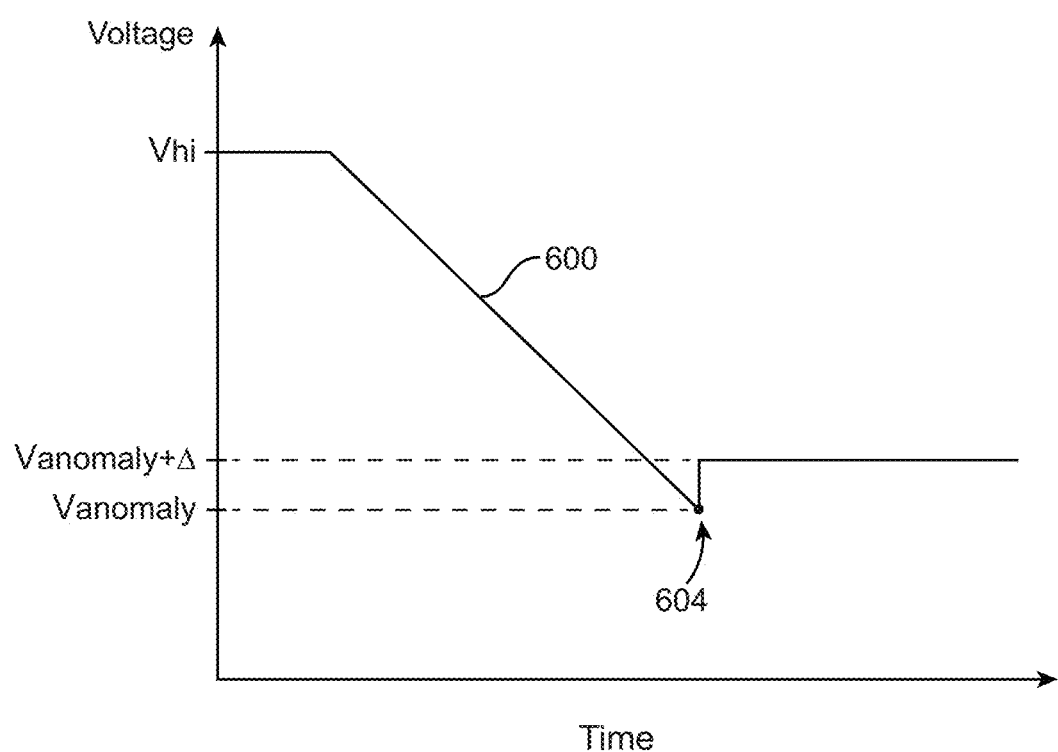
FIGS. 6A-6C are diagrams illustrating machine learning methods for detecting anomalies in accordance with an embodiment.

Each voltage rail (sometimes referred to as a power supply terminal or power supply line) may exhibit its own separate statistical profile. FIG. 6A illustrates a method by which anomaly detection can be used to solve the problem of adaptive voltage positioning, which is a particularly challenging problem for FPGA based systems in which the active circuit configuration on the FPGA is unknown a priori. As shown by ramp waveform 600 of FIG. 6A, the voltage (e.g., a power supply voltage or other control voltage) may start at the default high voltage level Vhi and may be reduced until the machine learning algorithm detects an anomaly. When an anomaly is detected at point 604 (i.e., when supply voltage hits threshold voltage level Vanomaly), the power profile may be slightly increased by a predetermined margin Δ to remove the anomaly. Margin Δ may be 5 mV, 10 mV, 50 mV, 100 mV, or other suitable voltage amount. Operated in this way, a safe reduced voltage level (Vanomaly+Δ) is determined for a given processing load, which saves energy while optimizing performance.

Figure 6B:
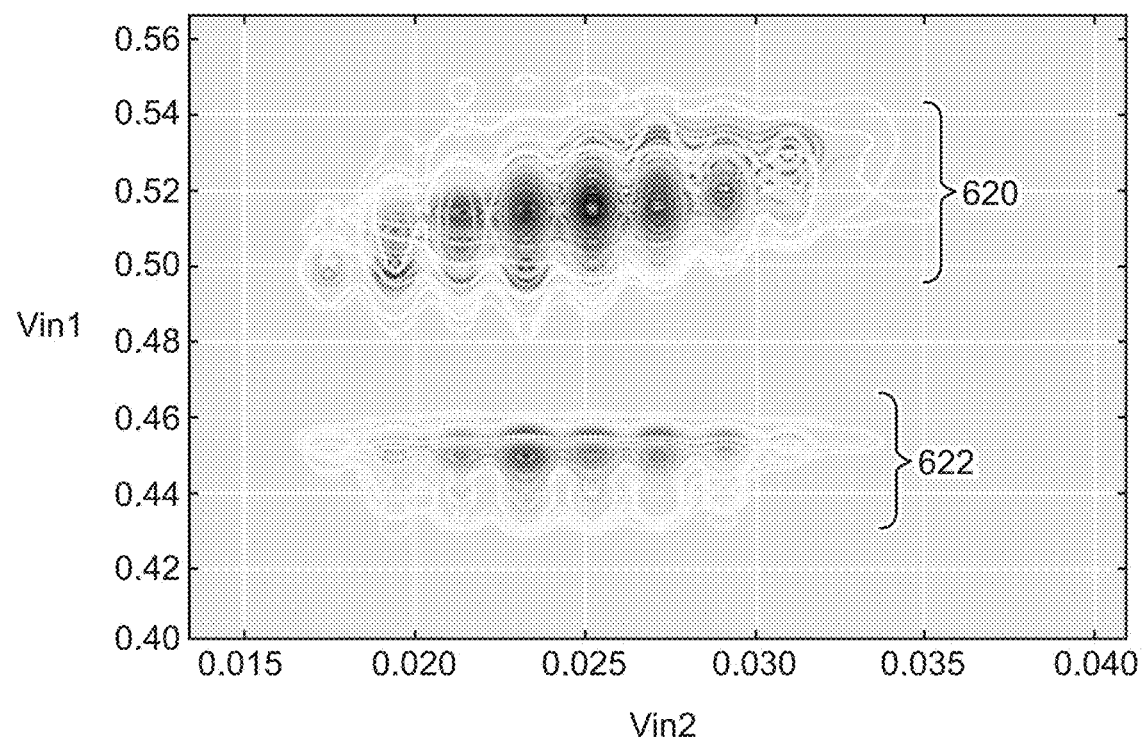

As an example, FIG. 6B illustrates bivariate probability density functions of two power supply voltages Vin1 and Vin2 for several workloads of two main types. Clustering or modeling identification techniques may be used to distinguish between the different workloads. Cluster 620 represents the power distribution under normal operating conditions, whereas cluster 622 represents the power distribution under anomalous operating conditions. Thus, the machine learning algorithm may be adapted to detect when the data switches from cluster 620 to cluster 622, signaling that Vanomaly has been reached.

Figure 6C:
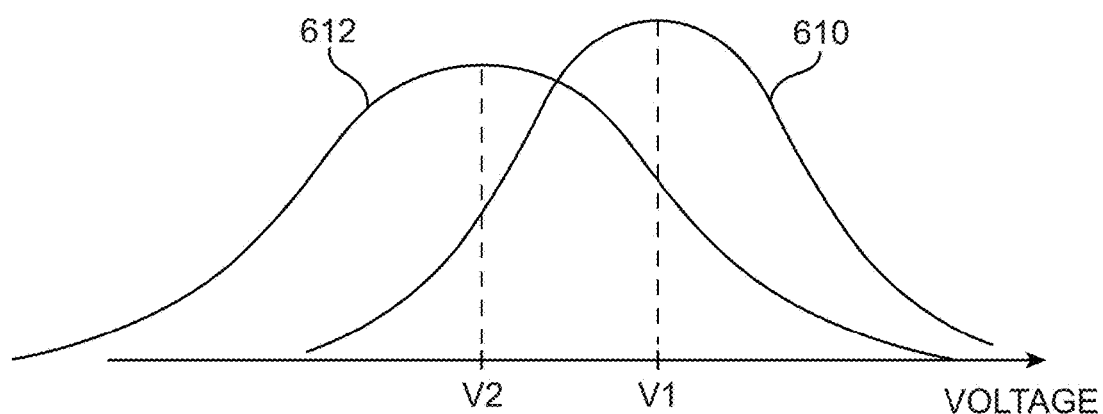

If desired, anomaly detection algorithms may also be configured to detect an anomaly for a system with a single power supply. As shown in FIG. 6C, a first power distribution curve 610 represents the power density profile centered at voltage V1 under normal operating conditions, whereas a second power distribution curve 612 represents the power density profile centered at voltage V2 under anomalous operating conditions. In this example, the mean and the standard deviation have shifted between the two profiles 610 and 612. The examples of FIGS. 6A-6C for detecting anomaly for one-two power rails are merely illustrative. In general, these concepts may be extended to applications with three or more adjustable parameters to detect anomalies of any suitable type.

Figure 7A:
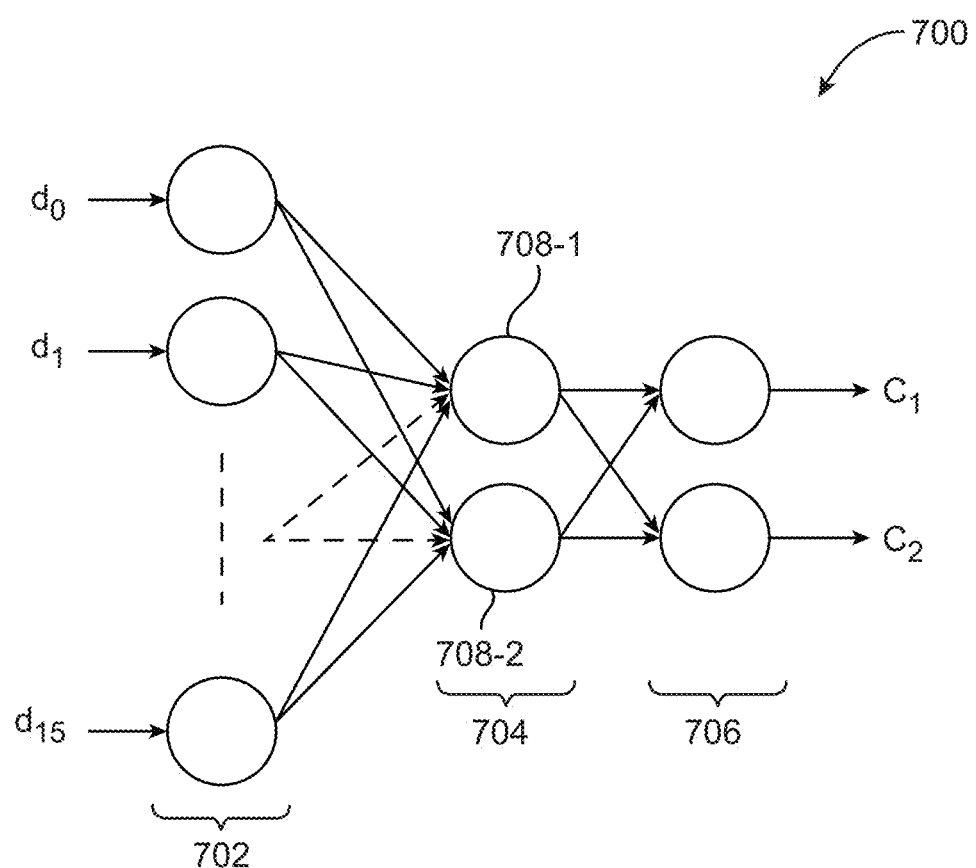
FIGS. 7A-7C are diagrams illustrating machine learning methods for classifying different data types in accordance with an embodiment.

To illustrate an example of a classification application, consider the analysis of power supply data for the purposes of supervised classification in a neural network. A basic structure for representing two categories or classes is shown in FIG. 7A. As shown in FIG. 7A, neural network representation 700 may include 16 input nodes 702 connected to two hidden nodes 704 (e.g., a first hidden node 708-1 and a second hidden node 708-2). The two hidden nodes may be connected to two output nodes 706. The output nodes may have biases, which are omitted for clarity.

Figure 7B:
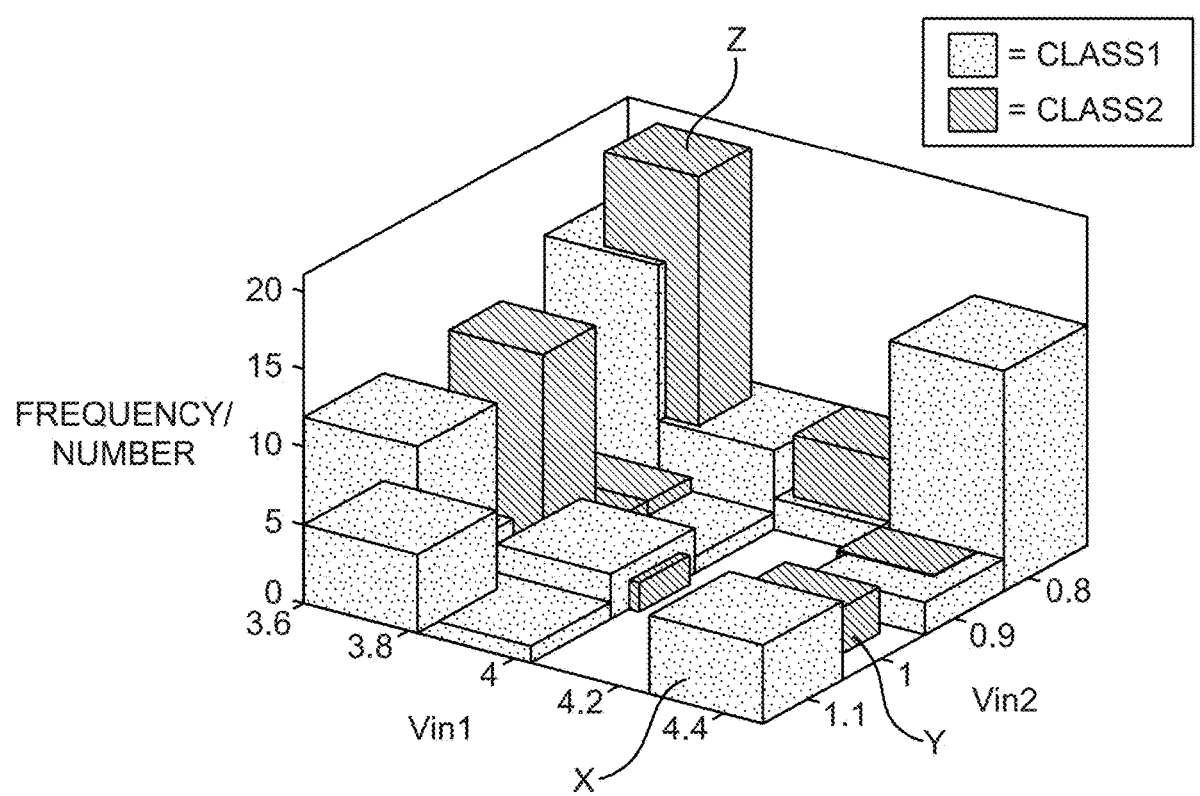

The 16 inputs d0-d15 represent 2-dimensional input data for two power supply voltages (or currents, etc.) and can be converted to a bivariate histogram such as the histogram of FIG. 7B. FIG. 7B plots first power supply voltage Vin1 versus second power supply voltage Vin2. The frequency at each intersecting voltage range is plotted for two different categories (e.g., class 1 and class 2). As shown in FIG. 7B, class 1 may exhibit a first two-dimensional (2D) profile distribution, whereas class 2 may exhibit a second 2D power profile distribution.

Figure 7C:
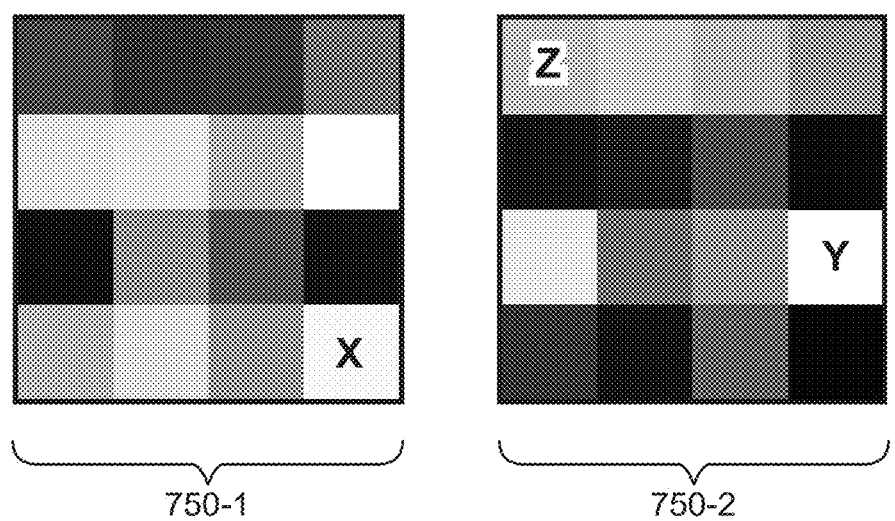

Once trained, the neural network learns the appropriate weights to identify the categories with up to 98% or higher degree of accuracy. FIG. 7C shows the learned weights at the hidden layer 704. As shown in FIG. 7C, a first weight matrix 750-1 corresponds to class 1 weights for hidden node 708-1, whereas second weight matrix 750-2 corresponds to class 2 weights for hidden node 708-2. In the diagram of FIG. 7C, a white cell in the matrix may represent absolute predominance of one class and the absence of the other, whereas a black cell in the matrix may represent the complete absence of that class or the absolute dominance of the other class. A gray cell may represent somewhere in between the two extremes in which both classes might be present or absent. For example, portion X in FIGS. 7B and 7C illustrates the dominance of class 1 over class 2 in that particular range of voltages. Conversely, portion Y in FIGS. 7B and 7C illustrates the dominance of class 2 over class 1 in that particular range of voltages. Portion Z illustrates a slight edge of class 2 over class 1 in that particular range of voltages.

As an example, class 1 may represent the pattern for video data, whereas class 2 may represent the pattern for voice data. As another example, class 1 may represent the pattern for normal operating, whereas class 2 may represent the pattern for anomalous operation. In other words, classification techniques may also implement anomaly detection. These examples are merely illustrative. In general, the detection of each category may match with a particular weight matrix pattern for different types of data. If desired, Radial Basis Function Neural Networks (RBFNN) may be employed to classify different categories in a similar manner.

Figure 8A:
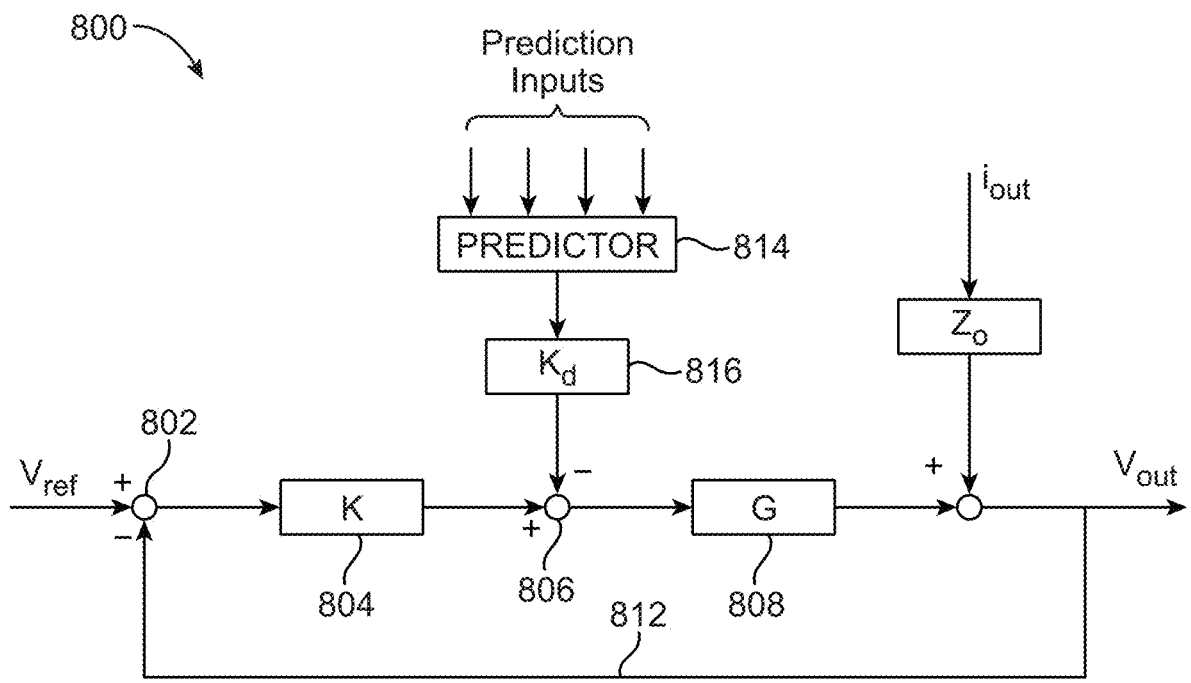
FIGS. 8A and 8B are diagrams of an illustrative predictive control system in accordance with an embodiment.

To illustrate an example of a prediction application, consider a feedforward DC-DC converter control system 800 of FIG. 8A, where K represents the controller (e.g., controller 314 of FIG. 3), G represents the power stage (e.g., power stage 300 of FIG. 3), Zo represents the output impedance of the power stage 808, and Kd is the feedforward control transfer function. The output of the system may be fed back to circuit 802 via feedback path 812, which is subtracted from a reference voltage level Vref to control the controller stage 804. Circuit 806 may combine the outputs of controller stage 804 and feedforward controller stage 816 to control power stage 808. A disturbance such as a load step on the output current iout may affect the output Vout via the output impedance Zo. If the feedforward transfer function Kd is designed such as Kd*G is equal to Zo, then perfect control can be achieved with an exact cancellation of the iout disturbance.

In accordance with an embodiment, feedforward controller 816 may derive its input from a predictor circuit such as load predictor 814. Predictor 814 may be configured to learn the characteristics of the load from features such that any load step at iout may be anticipated and applied to feedforward controller 816 in advance of the iout disturbance event. If desired, predictor stage 814 may be optionally incorporated into feedforward controller 816. Feedforward controller 816 may be part of a feedforward control loop. Operating system 800 in this way, near perfect control can be achieved. Predictor 814 may be suitably realized as a neural network (e.g., an Artificial Neural Network or a Radial Basis Function Neural Network) or by other machine learning means such as using Naïve Bayes, K-Nearest-Neighbor, Regression, Logistic Regression, and/or Kernel methods (just to name a few) either individually or in combination, in which bagging, bootstrapping, and tree methods may be employed.

Suitable prediction input features that can be received at predictor 814 may include load current iout, a load voltage (e.g., Vout or some other control voltage), statistics of the load current/voltage such as its mean, median, mode, standard deviation, etc. In a multi-supply system, similar signals for related loads may serve as useful prediction input features. Operational loads related to the load or characteristics of the load's operation (e.g., the program counter of a CPU or memory bus activity of an FPGA) may also be useful prediction input features. As such, the prediction input features can be foreseen to be highly dimensional. In certain situations, only a small number of prediction input features may be needed to accurately predict the load characteristics (e.g., only one feature is needed, only two features are needed, only three features are needed, only four features are needed, etc.).

Figure 8B:
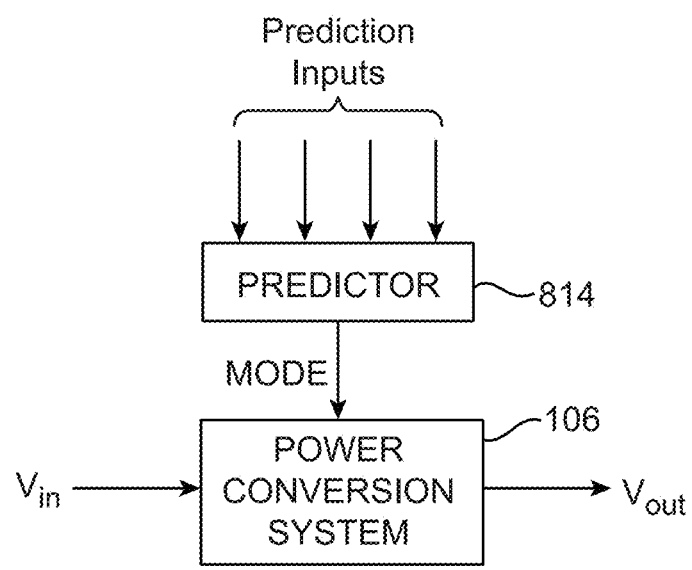

FIG. 8A is a schematic diagram that illustrates the structure of control system 800. FIG. 8B illustrates the actual hardware setup. As shown in FIG. 8B, predictor 814 may affect the mode of power conversion system 106. Predictor 814 may be configured to estimate the appropriate mode of power conversion system 106 for an anticipated event. Such modes may be aspects of the power stage (see, e.g., power stage 300 in FIG. 3) such as a continuous current mode (CCM), discontinuous current mode (DCM), a mode for selecting the number of active phases in a multi-phase converter, a mode for distributing current through various phases in accordance with an efficiency target/goal, etc.

Figure 9A:
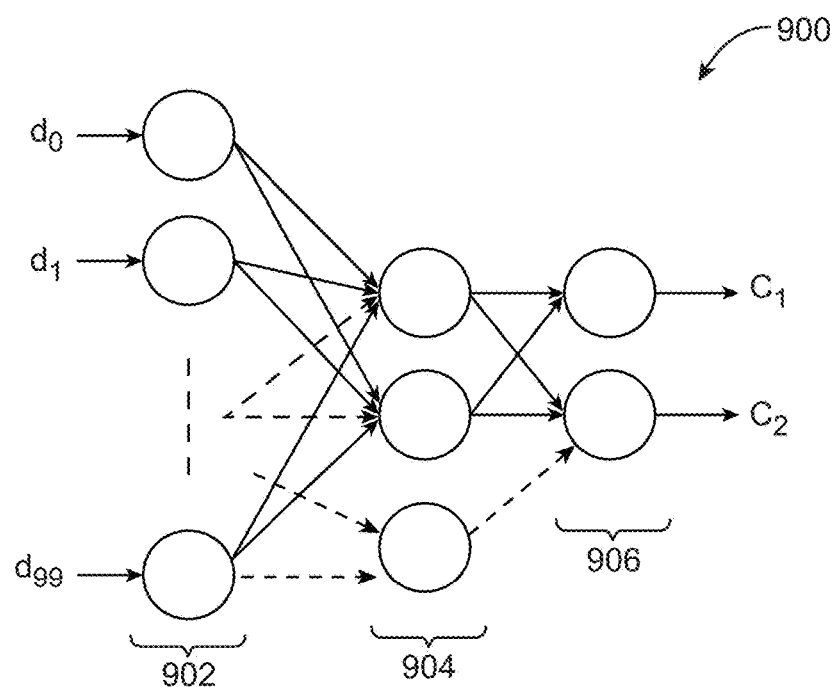
FIG. 9A is a diagram of an illustrative feedforward neural network for representing a predictive control system in accordance with an embodiment.

FIG. 9A is a diagram of an illustrative feedforward neural network 900 for representing the predictive control system of the type described in connection with FIGS. 8A and 8B. As shown in FIG. 9A. neural network 900 may include a hundred input nodes 902, a middle layer of ten nodes 904, and two output nodes 906. The one hundred inputs d0-d99 represent data that is fed from a sliding window of data points such as current measurements of a voltage rail. Similar to neural network 700 of FIG. 7A, the two output nodes 906 may also serve to classifying the data as one of two classes c1 or c2. In an example where the predictive system is configured to anticipate a load spike/peak, the first class is associated with current crossing or exceeding a predetermined threshold within the next three time steps (as an example), whereas the second class is associated with an anticipated loading behavior that will not cross the predetermined threshold.

Figure 9B:
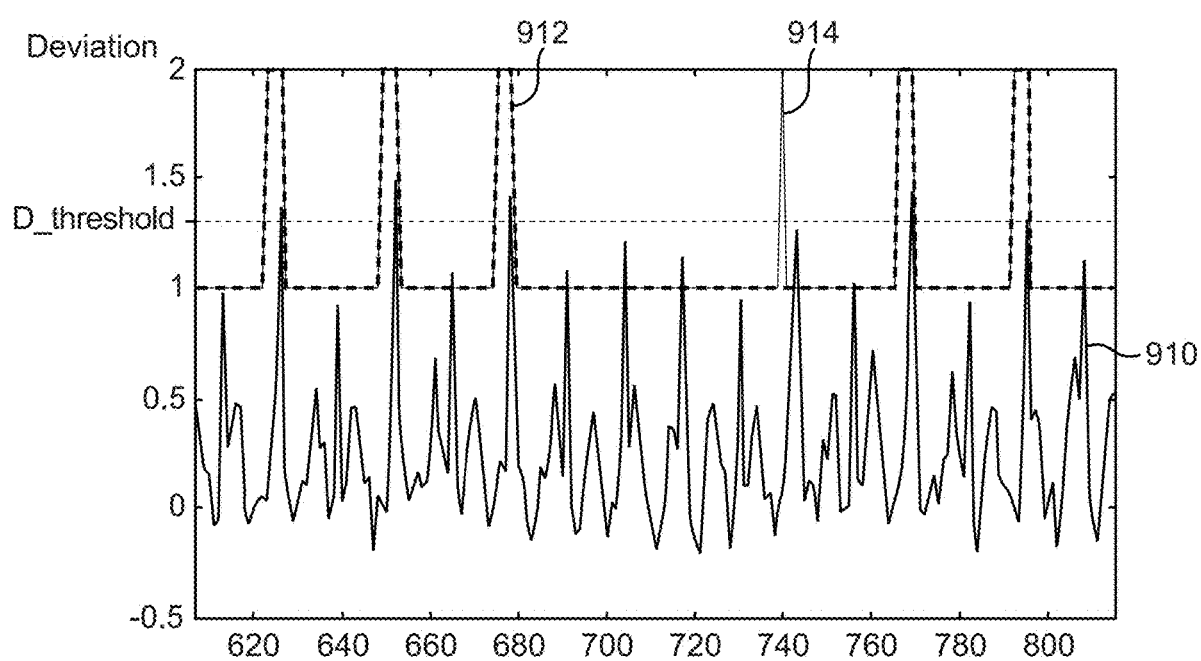
FIG. 9B is a timing diagram illustrating how extreme load deviations can be predicted in accordance with an embodiment.

FIG. 9B shows simulation results of the neural network prediction system 800. Waveform 910 represents the current measurement data (e.g., of output current iout) centered around zero. Thus, the plot of FIG. 9B illustrates the deviation from the nominal current level. The predictor may be configured to anticipate when waveform 910 exceeds predetermined threshold D_threshold. Dotted line 912 represents when the current actually crosses D_threshold in the next three time steps. Line 914 represents the output of the neural network, predicting when the current will cross D_threshold in the next three time step window. As shown in FIG. 9B, the prediction matches the actual behavior very closely. A 99%+ training set accuracy can be achieved by the predictive system. At around step 740 on the x-axis, the prediction 914 does not match the actual behavior 912, meaning that a threshold crossing is predicated but does not actually occur. In this case, line 914 will go back down immediately after it realizes the error.

Action may be taken in response to predicting a threshold crossing event. For example, predictor 814 may issue a mode switch as described in connection with FIG. 8B (e.g., to configure the power conversion system in a continuous current mode, discontinuous current mode, a mode for selecting the number of active phases in a multi-phase converter, a mode for distributing current through various phases in accordance with an efficiency target/goal, etc.), or to supply additional current efficiently to mitigate voltage deviation at the power supply rail three time steps prior to the anticipated event.

Figure 10:
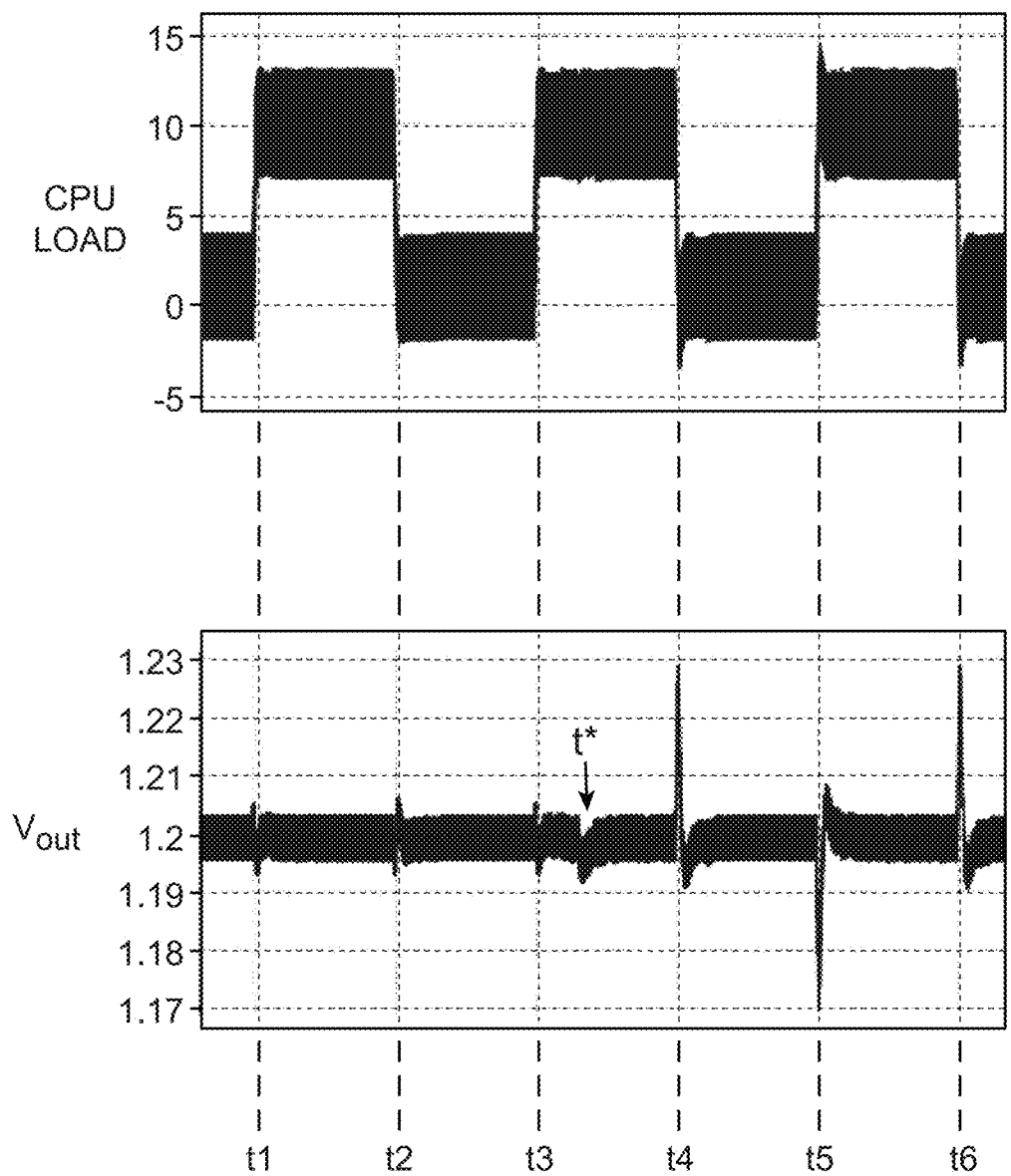
FIG. 10 show how load prediction can help reduce power supply voltage deviation in accordance with an embodiment.

As described above in connection with at least FIG. 8A, the prediction may be utilized to inform feedforward controller 816 to improve control. FIG. 10 shows the output voltage deviation in response to load current steps at the CPU or FPGA. Prior to time t*, load step prediction and feedforward control is active, and the Vout deviation at times t1-t3 is fairly well-controlled. At time t*, the load step prediction and feedforward control is turned off. At time t4-t6, the Vout deviation is fairly pronounced. The use of predictor 814 with the feedforward controller 816 can therefore provide reduced voltage perturbation at any number of power supply rails (as an example).

The example of FIGS. 8-10 in which machine learning can be applied to predict voltage and current behavior is merely illustrative. If desired, machine learning algorithms may be used to monitor any suitable parameter in the overall system and to anticipate and mitigate any type of undesired dynamic event.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is a system, comprising: an integrated circuit; a power stage configured to receive an input voltage and to generate a corresponding output voltage to power the integrated circuit; control circuitry configured to extract and to process data gathered from the power stage; and a power data processor configured to analyze the data and to direct the control circuitry to take suitable action based on the analysis of the data.

Example 2 is the system of example 1, wherein the power data processor is optionally configured to use a machine learning algorithm to analyze the data.

Example 3 is the system of example 2, wherein the power data processor is optionally further configured to use the machine learning algorithm to detect an anomaly within the system.

Example 4 is the system of example 2, wherein the power data processor is optionally further configured to use the machine learning algorithm to categorize the data into different classes.

Example 5 is the system of example 2, wherein the power data processor is optionally further configured to use the machine learning algorithm to predict a loading event at the integrated circuit.

Example 6 is the system of any one of examples 1-5, wherein the control circuitry optionally comprises a reduction circuit configured to reduce the data via compression or symbolic representation.

Example 7 is the system of example 6, wherein the control circuitry optionally further comprises: a controller configured to control the power stage; a power manager coupled to the controller and the power data processor; and a memory circuit configured to store the reduced data.

Example 8 is the system of any one of examples 1-5, optionally further comprising: a prediction circuit configured to anticipate loading events and to control the power stage, wherein the predictor is part of a feedforward control system.

Example 9 is the system of any one of examples 1-5, wherein the power data processor comprises a local analytics block, the system optionally further comprising: a remote analytics block configured to analyze the data remotely and to direct the control circuitry to take suitable action based on the analysis of the data.

Example 10 a method of operating a power analytics system, the method comprising: using a power conversion system to power an integrated circuit and to collect data while powering the integrated circuit; using the power conversion system to process the collected data; using a power data processor to analyze the processed data by applying machine learning to the processed data; and using the power data processor to direct the power conversion system to take suitable action based on the analysis of the data.

Example 11 is the method of example 10, wherein using the power conversion system to process the collected data optionally comprises reducing the data.

Example 12 is the method of example 10, wherein applying the machine learning to the processed data optionally comprises performing anomaly detection.

Example 13 is the method of example 10, wherein applying the machine learning to the processed data optionally comprises categorizing the data into different classes.

Example 14 is the method of example 10, wherein applying the machine learning to the processed data optionally comprises predicting when a parameter crosses a predetermined threshold.

Example 15 is the method of any one of examples 10-14, wherein applying the machine learning to the processed data optionally comprises: performing unsupervised machine learning at the power data processor; and performing supervised machine learning at a cloud, wherein the supervised machine learning is more computationally intensive than the unsupervised machine learning.

Example 16 is an apparatus, comprising: an integrated circuit; a power conversion system configured to output a power supply voltage to the integrated circuit and further configured to collect data; and an analytics block configured to use machine learning to analyze the collected data and to act upon the collected data.

Example 17 is the apparatus of example 16, wherein the analytics block optionally uses the machine learning to enable dynamic voltage scaling at the integrated circuit by performing anomaly detection on the collected data.

Example 18 is the apparatus of example 16, wherein the analytics block optionally uses the machine learning to identify attack vectors at the integrated circuit by performing anomaly detection on the collected data.

Example 19 is the apparatus of example 16, wherein the analytics block optionally uses the machine learning to enable a tighter voltage tolerance for the power supply voltage by performing load prediction based on the collected data.

Example 20 is the apparatus of example 16, wherein the analytics block optionally uses the machine learning to identify a suitable power mode for the power conversion system by categorizing the collected data into different classes.

Example 21 is a power analytics system, comprising: means for powering an integrated circuit and to collect data while powering the integrated circuit; means for processing the collected data; means for analyzing the processed data by applying machine learning to the processed data; and means for taking suitable action based on the analysis of the data.

Example 22 is the power analytics system of example 21, wherein the means for processing the collected data optionally comprises means for reducing the data.

Example 23 is the power analytics system of example 21, wherein the means for applying the machine learning to the processed data optionally comprises means for performing anomaly detection.

Example 24 is the power analytics system of example 21, wherein means for applying the machine learning to the processed data optionally comprises means for categorizing the data into different classes.

Example 25 is the power analytics system of example 21, wherein the means for applying the machine learning to the processed data optionally comprises means for predicting when a parameter crosses a predetermined threshold.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. A system, comprising:
   an integrated circuit;
   a power stage configured to receive an input voltage and to generate a corresponding output voltage to power the integrated circuit;
   control circuitry configured to extract and to process data gathered from the power stage; and
   a power data processor configured to analyze the data and to direct the control circuitry to take suitable action based on the analysis of the data.

2. The system of claim 1, wherein the power data processor is configured to use a machine learning algorithm to analyze the data.

3. The system of claim 2, wherein the power data processor is further configured to use the machine learning algorithm to detect an anomaly within the system.

4. The system of claim 2, wherein the power data processor is further configured to use the machine learning algorithm to categorize the data into different classes.

5. The system of claim 2, wherein the power data processor is further configured to use the machine learning algorithm to predict a loading event at the integrated circuit.

6. The system of claim 1, wherein the control circuitry comprises a reduction circuit configured to reduce the data via compression or symbolic representation.

7. The system of claim 6, wherein the control circuitry further comprises:
   a controller configured to control the power stage;
   a power manager coupled to the controller and the power data processor; and
   a memory circuit configured to store the reduced data.

8. The system of claim 1, further comprising:
   a prediction circuit configured to anticipate loading events and to control the power stage, wherein the predictor is part of a feedforward control system.

9. The system of claim 1, wherein the power data processor comprises local analytics circuitry, the system further comprising:
   remote analytics circuitry configured to analyze the data remotely and to direct the control circuitry to take suitable action based on the analysis of the data.

10. A method of operating a power analytics system, the method comprising:
    using a power conversion system to power an integrated circuit and to collect data while powering the integrated circuit;
    using the power conversion system to process the collected data;
    using a power data processor to analyze the processed data by applying machine learning to the processed data; and
    using the power data processor to direct the power conversion system to take suitable action based on the analysis of the data.

11. The method of claim 10, wherein using the power conversion system to process the collected data comprises reducing the data.

12. The method of claim 10, wherein applying the machine learning to the processed data comprises performing anomaly detection.

13. The method of claim 10, wherein applying the machine learning to the processed data comprises categorizing the data into different classes.

14. The method of claim 10, wherein applying the machine learning to the processed data comprises predicting when a parameter crosses a predetermined threshold.

15. The method of claim 10, wherein applying the machine learning to the processed data comprises:
performing unsupervised machine learning at the power data processor; and
performing supervised machine learning at a cloud, wherein the supervised machine learning is more computationally intensive than the unsupervised machine learning.

16. An apparatus, comprising:
an integrated circuit;
a power conversion system configured to output a power supply voltage to the integrated circuit and further configured to collect data; and
analytics circuitry configured to use machine learning to analyze the collected data and to act upon the collected data to enable dynamic voltage scaling at the integrated circuit.

17. The apparatus of claim 16, wherein the analytics circuitry uses unsupervised machine learning to enable the dynamic voltage scaling at the integrated circuit by performing anomaly detection on the collected data, wherein the unsupervised machine learning runs during normal operation of the integrated circuit.

18. The apparatus of claim 16, wherein the analytics circuitry uses the machine learning to identify attack vectors at the integrated circuit by performing anomaly detection on the collected data.

19. The apparatus of claim 16, wherein the analytics circuitry uses the machine learning to enable a tighter voltage tolerance for the power supply voltage by performing load prediction based on the collected data.

20. The apparatus of claim 16, wherein the analytics circuitry uses the machine learning to identify a suitable power mode for the power conversion system by categorizing the collected data into different classes.

* * * * *